United States Patent
Giles et al.

(10) Patent No.: US 9,327,839 B2
(45) Date of Patent: May 3, 2016

(54) METHOD AND APPARATUS FOR INHIBITING FORMATION OF AND/OR REMOVING ICE FROM AIRCRAFT COMPONENTS

(75) Inventors: Alan M. Giles, Apple Valley, CA (US); James T. Machin, Wrightwood, CA (US); John A. Geriguis, Wrightwood, CA (US)

(73) Assignee: General Atomics, San Diego, CA (US)

( * ) Notice: Subject to any disclaimer, the term of this patent is extended or adjusted under 35 U.S.C. 154(b) by 799 days.

(21) Appl. No.: 13/204,630

(22) Filed: Aug. 5, 2011

(65) Prior Publication Data

US 2013/0032671 A1    Feb. 7, 2013

(51) Int. Cl.
*B64D 15/16* (2006.01)
*B64D 15/20* (2006.01)

(52) U.S. Cl.
CPC .............. *B64D 15/16* (2013.01); *B64D 15/163* (2013.01); *B64D 15/20* (2013.01)

(58) Field of Classification Search
CPC ...... B64F 5/0054; B64D 15/16; B64D 15/163
USPC .................... 244/134 R, 134 D, 134 E, 134 F
See application file for complete search history.

(56) References Cited

U.S. PATENT DOCUMENTS

| | | | |
|---|---|---|---|
| 3,672,610 A | 6/1972 | Levin | |
| 4,461,178 A | 7/1984 | Chamuel | |
| 4,604,612 A | 8/1986 | Watkins et al. | |
| 4,732,351 A | * 3/1988 | Bird | ........................... 244/134 D |
| 5,206,806 A | 4/1993 | Gerardi | |
| 5,318,253 A | 6/1994 | Levin | |
| 5,467,944 A | 11/1995 | Luukkala | |
| 5,553,815 A | * 9/1996 | Adams et al. | ............. 244/134 R |

(Continued)

FOREIGN PATENT DOCUMENTS

| | | |
|---|---|---|
| EP | 1081359 | 3/2001 |
| FR | 2998921 A1 * | 6/2014 |

(Continued)

OTHER PUBLICATIONS

'NASA Invention of the Year' Controls Noise and Vibration, https://spinoff.nasa.gov/Spinoff2007/ip_9.html, Aug. 25, 2008.*

(Continued)

*Primary Examiner* — Brian M O'Hara
(74) *Attorney, Agent, or Firm* — Fitch, Even, Tabin & Flannery LLP

(57) ABSTRACT

Methods and systems are generally described that inhibit debris (such as ice) accretions and/or remove debris (such as ice) accretions from the exterior surface of an aircraft. In some embodiments, the invention is a system for an aircraft comprising: a component of the aircraft having a surface; a plurality of piezo-kinetic actuators each positioned proximate to a portion of the surface; and a control unit coupled to the plurality of actuators, the control unit configured to actuate one or more of the actuators at one or more frequencies between about 1 Hz and about 1 kHz; wherein the actuators are each configured to introduce a displacement of the surface in three dimensions to inhibit a formation of ice on at least the portion of the surface and to break up existing ice formations on at least the portion of the surface.

35 Claims, 9 Drawing Sheets

(56) References Cited

U.S. PATENT DOCUMENTS

| | | | |
|---|---|---|---|
| 6,283,411 | B1 | 9/2001 | Giamati |
| 6,629,341 | B2 | 10/2003 | Wilkie |
| 7,084,553 | B2 | 8/2006 | Ludwiczak |
| 7,157,663 | B1* | 1/2007 | Kismarton ............... 219/201 |
| 7,459,831 | B2 | 12/2008 | Ludwiczak |
| 8,146,866 | B2* | 4/2012 | Tenebre ............ B64D 15/163 244/134 R |
| 8,517,313 | B2 | 8/2013 | Gornik |
| 2005/0193507 | A1 | 9/2005 | Ludwiczak |
| 2009/0120471 | A1 | 5/2009 | Ludwiczak |
| 2009/0224104 | A1 | 9/2009 | Tenebre |
| 2010/0206990 | A1* | 8/2010 | Petrenko ............... 244/134 D |

FOREIGN PATENT DOCUMENTS

| | | |
|---|---|---|
| GB | 1251745 | 10/1971 |
| GB | 2472053 | 1/2011 |
| JP | 2005/145453 | 6/2005 |
| KR | 10-1998-0025919 | 7/1998 |
| NL | 165986 B | 1/1981 |
| WO | WO 2009019696 A2 * | 2/2009 |
| WO | WO 2013/022767 | 2/2013 |

OTHER PUBLICATIONS

Palacios et al.; *Investigation of an Ultrasonic Ice Protection System for Helicopter Rotor Blades*; American Helicopter Society 64th Annual Forum; Apr. 2008; pp. 1-10; American Helicopter Society International, Inc.; USA.

Smith et al.; *Piezoelectric Shear Wave Induced Anti-Icing System*; Rotorcraft Center of Excellence, Pennsylvania State University; pp. 1-17; published at http://www.psu.edu/courses/aersp/aersp097_ecs5/097/Navy-Breifings/Icing%20Proposal.ppt; available as of at least Aug. 4, 2011; PA, USA.

PCT; App. PCT/US2012/049560; International Search Report mailed Jan. 29, 2013.

PCT; App. PCT/US2012/049560; Written Opinion mailed Jan. 29, 2013.

Graf, Rudolf F.; Modern Dictionary of Electronics, Sixth Edition; 1984; 5 pages; Howard W. Sam & Co., Inc.; Indianapolis, Indiana.

IEEE; IEEE Standard Dictionary of Electrical and Electronics Terms, Second Edition; 1977; 3 pages; The Institute of Electrical and Electronics Engineers, Inc.; New York, New York.

IEEE; IEEE Standard Dictionary of Electrical and Electronics Terms, Third Edition; 1984; 4 pages; The Institute of Electrical and Electronics Engineers, Inc.; New York, New York.

IEEE; The New IEEE Standard Dictionary of Electrical and Electronics Terms [Including Abstracts of All Current IEEE Standards], Fifth Edition; Jan. 15, 1993; 4 pages; The Institute of Electrical and Electronics Engineers, Inc.; New York, New York.

Orlin Technologies Ltd.; Piezo Technology—How They Work; published at http://web.archive.org/web/20110216071915/http://www.orlin.co.uk/tech-piezo.htm; Feb. 16, 2011; 2 pages; Orlin Technologies Ltd.

Smart Material Corporation; MFC Product Main; published at http://web.archive.org/web/20110226121440/http://www.smart-material.com/MFC-product-main.html; Feb. 26, 2011; 4 pages; Smart Material.

Wikipedia; Leading Edge; published at http://web.archive.org/web/20110302162849/http://en.wikipedia.org/wiki/Leading_edge; Mar. 2, 2011; 1 page; Wikipedia.

Wikipedia; Solid State (electronics); published at http://web.archive.org/web/20110620220727/http://en.wikipedia.org/wiki/Solid-state_(electronics); Jun. 20, 2011; 2 pages; Wikipedia.

Venna, Suresh V., et al.; 'Piezoelectric Transducer Actuated Leading Edge De-Icing with Simultaneous Shear and Impulse Forces;' Journal of Aircraft; Mar. 2007; pp. 507-515; vol. 44; No. 2.

EPO; App. No. 12822015.9; Extended Search Report mailed Feb. 15, 2015.

* cited by examiner

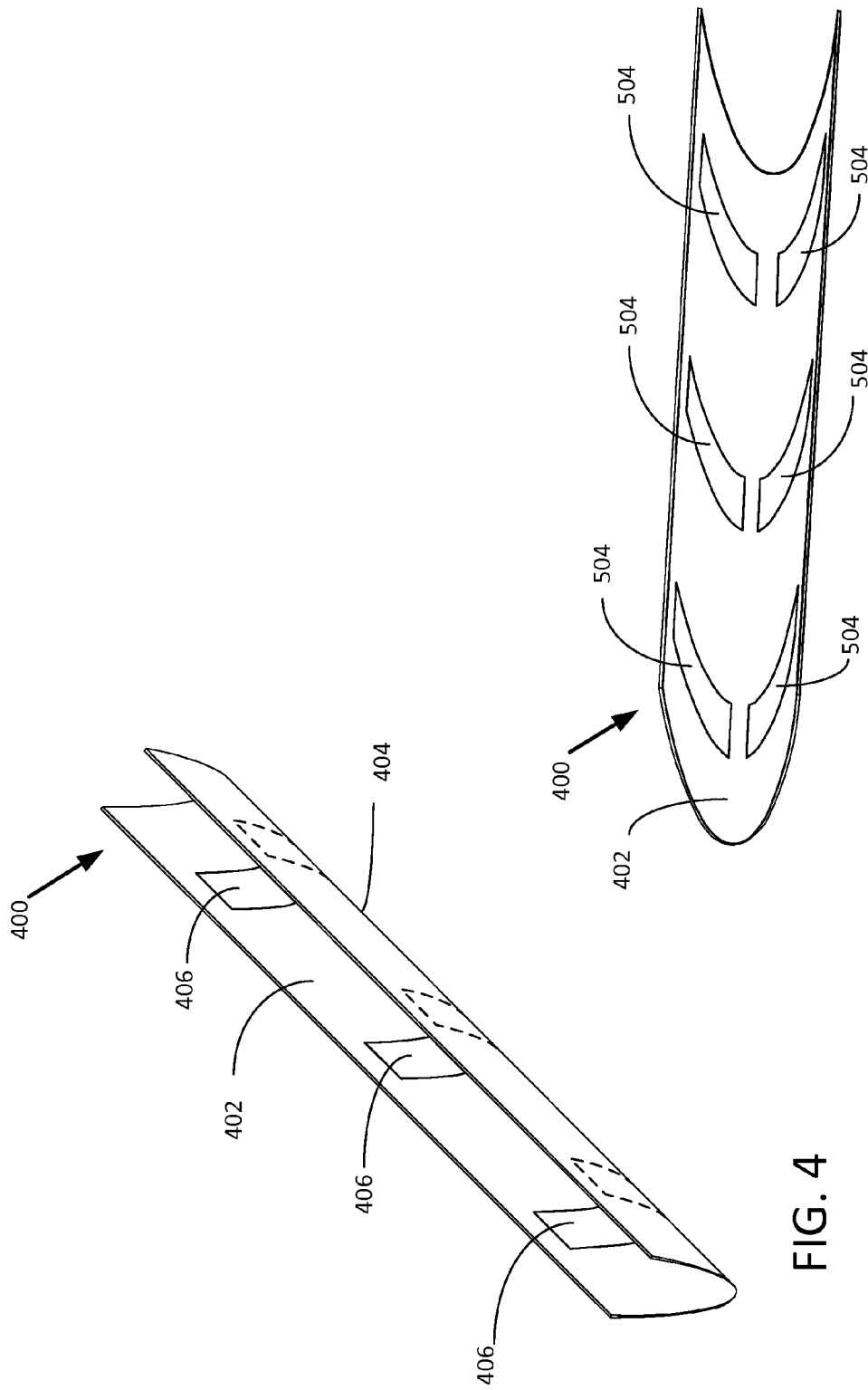

ated herein it its entirety. For example, Palacios et al. discloses the use of ultrasonic 28.5 kHz radial resonance disk actuators for inducing ultrasonic transverse shear stress for delaminating ice layers formed on a helicopter rotor blade.

METHOD AND APPARATUS FOR INHIBITING FORMATION OF AND/OR REMOVING ICE FROM AIRCRAFT COMPONENTS

BACKGROUND OF THE INVENTION

1. Field of the Invention

The present invention relates generally to de-icing systems. More specifically, the invention relates to de-icing systems for use on the outer surface of an aircraft flight surface.

2. Discussion of the Related Art

Atmospheric icing occurs when water droplets in the atmosphere freeze on objects they contact. Atmospheric icing can lead to the buildup of ice on the exterior surfaces of an aircraft can cause significant changes in the aerodynamics of various flight surfaces. Such changes may enhance safety risks by altering airflow and increasing drag over the aircraft's lift and flight control surfaces.

Ice protection systems are commonly employed to deal with the problems of aircraft icing. Traditionally, de-icing systems rely on chemical or thermal means to prevent and/or remove ice formation/s. Additionally, some conventional de-icing systems create high-frequency (ultrasonic) transverse shear stress for delaminating ice layers on an isotropic structure. One such teaching is described in a publication by Jose L. Palacios, Edward C. Smith and Joseph L. Rose of Pennsylvania State University, entitled *Investigation of an Ultrasonic Ice Protection System for Helicopter Rotor Blades*, (hereinafter "Palacios et al."); copyright 2008 by the American Helicopter Society International, Inc., which is incorporated herein it its entirety. For example, Palacios et al. discloses the use of ultrasonic 28.5 kHz radial resonance disk actuators for inducing ultrasonic transverse shear stress for delaminating ice layers formed on a helicopter rotor blade.

Another method and apparatus for removing debris from a windshield or air foil is taught by U.S. Patent Application No. 2009/0120471 and U.S. Pat. Nos. 7,459,831 and 7,084,553, to Ludwiczak, all of which are incorporated herein by reference. Particularly, U.S. Application No. 2009/0120471 entitled Vibrating Debris Remover, discloses a device for attachment along the edge of a material, such as a car windshield or airfoil (such as an aircraft wing), including a vibration subunit that produces vibrating mechanical energy to remove solid debris from the surface of the material.

SUMMARY OF THE INVENTION

In one embodiment, a system for an aircraft comprises: a component of the aircraft having a surface; a plurality of actuators each positioned proximate to a portion of the surface; and a control unit coupled to the plurality of actuators, the control unit configured to drive one or more of the plurality of actuators at one or more frequencies between about 1 Hz and about 1 kHz; wherein the plurality of actuators are each configured to introduce a displacement of the surface in three dimensions to inhibit a formation of ice on at least the portion of the surface and/or to break up existing ice formations on at least the portion of the surface.

In another embodiment, a method for use with an aircraft comprises: driving a plurality of actuators each positioned proximate to a portion of a surface of a component of the aircraft; and driving one or more of the plurality of actuators at one or more frequencies between about 1 Hz and about 1 kHz such that each of the plurality of actuators introduce a displacement of the surface in three dimensions to inhibit a formation of ice on at least the portion of the surface and/or to break up existing formations of the ice on at least the portion of the surface.

In another embodiment, a method for use in an aircraft comprises: determining that a condition is present, the condition indicating potential ice formation on a surface of an aircraft; driving a plurality of actuators in response to the determining step, the plurality of actuators proximate to a surface of the aircraft; transferring energy from the plurality of actuators to the surface to inhibit a formation of ice on at least a portion of the surface; determining that the condition is no longer present; and discontinuing the driving the plurality of actuators and the transferring the energy steps.

In another embodiment, a method for use in inhibiting ice formation on an aircraft, comprises: selectively driving a plurality of actuators in time in a sequence relative to each other, the plurality of actuators proximate to a surface of the aircraft and arranged in a pattern extending across at least a portion of the surface; transferring energy from the plurality of actuators to the surface to inhibit a formation of ice on at least a portion of the surface and to break up existing formations of the ice on the at least the portion of the surface.

In another embodiment, a method for use in inhibiting ice formation on an aircraft, comprises: driving a plurality of actuators at each of a plurality of predetermined frequencies within a predetermined time period, the plurality of actuators proximate to a surface of the aircraft; transferring energy from the plurality of actuators to the surface to inhibit a formation of ice on at least a portion of the surface and to break up existing formation of the ice on the at least the portion of the surface.

In yet another embodiment, a method for use with an ice inhibiting system for an aircraft comprises: identifying a host material and a shape of a surface of an aircraft, the surface to be exposed during flight of the aircraft; modeling the host material and the shape to determine resonant frequencies of the shape; coupling a plurality of actuators in proximity to at least a portion of the shape; driving the plurality of actuators at at least the resonant frequencies; measuring an impedance of the plurality of actuators as a function of frequency; selecting, based on the measuring, a plurality of resonant frequencies for use in driving the plurality of actuators during flight of the aircraft in order to inhibit a formation of ice on at least a portion of the surface and to break up existing formation of the ice on the at least the portion of the surface.

BRIEF DESCRIPTION OF THE DRAWINGS

The above and other aspects, features and advantages of several embodiments of the invention will be more apparent from the following more particular description thereof, presented in conjunction with the following drawings.

FIG. 4 is a perspective view of a component of an aircraft, shown with a plurality of actuators disposed on the inner surface in accordance with some embodiments of the invention;

FIG. 5 is a perspective view of a component of an aircraft with a plurality of actuators disposed on an inner surface in accordance with some embodiments of the invention;

Figure 1:
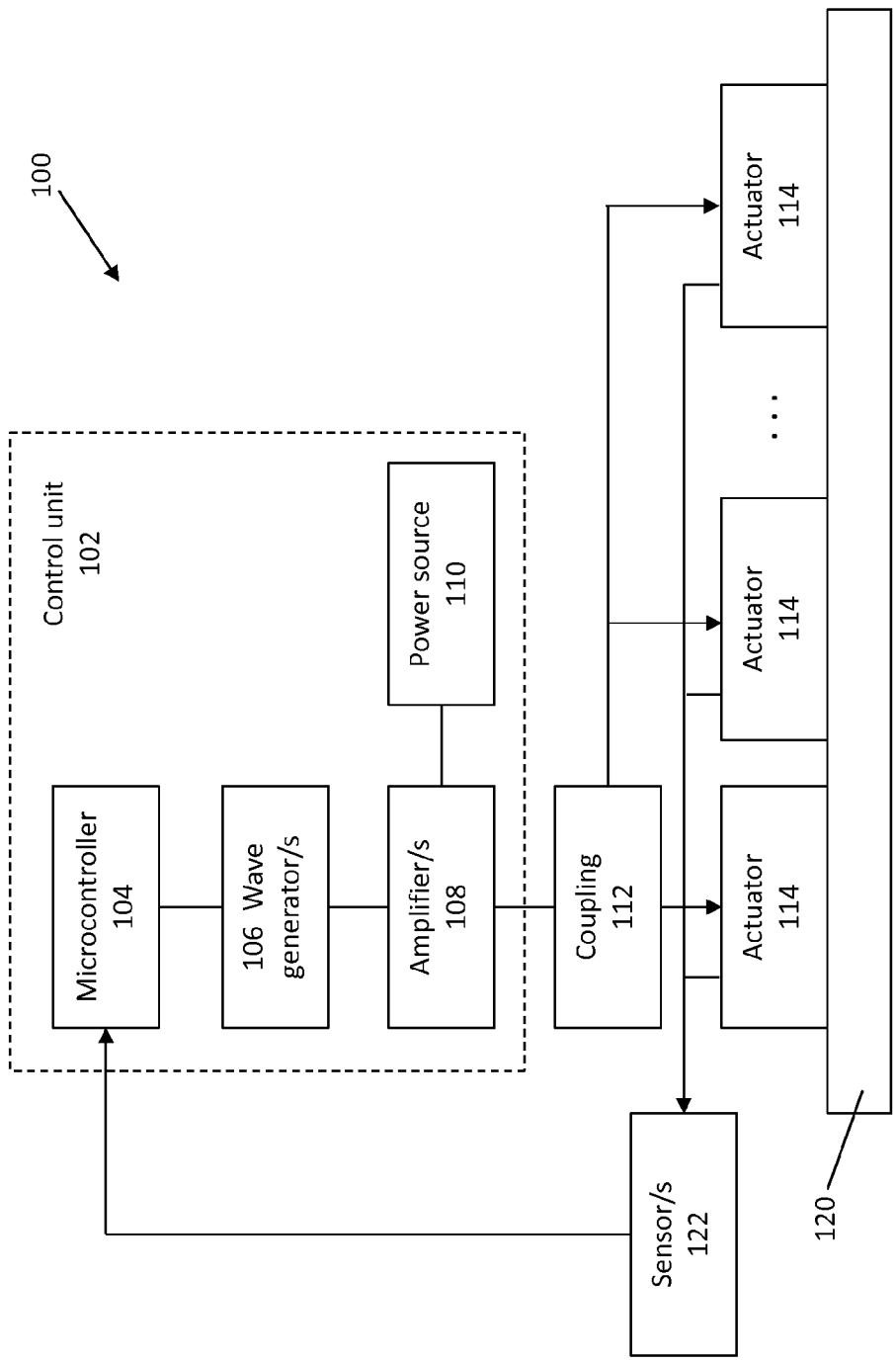
FIG. 1 is a block diagram depicting a de-icing system comprising a control system for coordinating actuation of one or more actuators in accordance with an embodiment of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the invention. Also, common but well-understood elements that are useful or necessary in a commercially feasible embodiment are often not depicted in order to facilitate a less obstructed view of these various embodiments of the invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the invention. Thus, appearances of the phrases "in one embodiment," "in an embodiment," and similar language throughout this specification may, but do not necessarily, all refer to the same embodiment.

Referring first to FIG. 1, a system 100 is shown for use in removing and/or inhibiting the accretion of ice on an aircraft component surface, according to some embodiments of the invention. Specifically, the system 100 comprises a control unit 102, wherein the control unit 102 further comprises: a microcontroller 104, a wave generator 106, an amplifier 108 and a power source 110. The system 100 further comprises a coupling 112, actuators 114, a component 120 and a sensor 122. One of skill in the art would understand that, depending on the embodiment, the system 100 could comprise additional or fewer actuators than are depicted in FIG. 1. Additionally, the wave generator 106 may comprise one or more wave generators; similarly, the amplifier 108 may comprise one or more amplifier circuits and the sensor 122 may comprise one or more sensing devices.

In the illustrated embodiment, the control unit 102 is configured such that the microcontroller 104 is coupled to the wave generator 106; the wave generator 106 being coupled to the amplifier 108 and wherein the power source 110 is further coupled to the amplifier 108. In some embodiments, the control unit 102 is coupled to the coupling 112 wherein the coupling 112 is further coupled to each of the actuators 114. In some embodiments, each of the actuators 114 will be further coupled to the sensor 122, wherein the sensor 122 is also coupled to the microcontroller 104 of the control unit 102. In the illustrated embodiment, the one or more actuator/s 114 are mechanically disposed on (or proximate to) the component 120. For example, in some embodiments the one or more actuator/s 114 are each positioned on or proximate to the component 120 in a manner corresponding to a curvature of the surface of the component 120. In some embodiments, the one or more actuator/s 114 can be embedded within the component 120. For example, the one or more actuator/s 114 may be embedded within multiple layers of a composite material forming the component 120.

The coupling 112 may comprise essentially any mechanism by which electrical signaling may be transmitted from the control unit 102 to one or more of a plurality of the actuators 114. For example, the coupling 112 may comprise, but is not limited to: wires, switches or electrical connectors etc. In some embodiments, communication between the control unit 102 and the coupling 112 and/or communication between the coupling 112 and the one or more actuator/s 114, may be achieved using a wireless signal. Additionally, in some embodiments, the control unit 102 will be designed so as to minimize the mass of the control unit 102.

In some embodiments, the control unit 102 will be designed so as to minimize the control unit 102 weight or mass with respect to the size and/or output of a power supply. For example, the control unit 102 may be designed to minimize the ratio of the control unit mass to the mass of power source 110. By way of example, the control unit 102 may be designed such that the control unit 102 is configured to provide power and the one or more of the plurality of actuators are configured to operate at a power to actuator-area ratio of no more than about 0.1 watts per square centimeter. In some embodiment, the total system power does not to exceed 2 kW per aircraft. In some embodiments, the power to actuator-area ratio will be approximately 0.03 watts per square centimeter. In some embodiments, the control unit 102 will weigh less than an absolute amount; by way of example, the control unit 102 may be constructed so as to not exceed a weight of 25 pounds. Furthermore, in some embodiments the control unit may be configured so as to not exceed a specific weight to power output ratio. For example, in some embodiments the control unit 102 may be configured to have a weight to power output ratio of less than 0.0125 lbs per watt. In some embodiments, the control unit 102 may be configured to have a weight to power output ratio of less than 0.01 lbs per watt. In some embodiments the control unit 102 may be configured to have a weight to power output ratio of less than 0.005 lbs per watt.

In some embodiments, each of the one or more actuator/s 114 may comprise one or more electrically driven spherical piezo-kinetic actuators. According to some embodiments the one or more actuator/s 114 may be flexible able to substantially conform to the curvature of a surface (e.g., a curvature of the component 120).

According to some embodiments, the component 120 may comprise an isotropic or composite material such as an alloy, carbon fiber, graphite, a polymer, a thermoplastic or a fiberglass, etc. For example, in some embodiments, the component 120 may comprise, but is not limited to, one or more aircraft components and/or flight surfaces such as an aircraft wing, an aircraft tail, an airfoil, an aircraft rudder, an aircraft control surface (such as a flap or elevator), a wind turbine blade, an engine intake surface, or a helicopter rotor blade, etc. By way of example, the one or more actuator/s 114 may be embedded within one or more layers of a composite material forming an aircraft component. For example, the one or more actuator/s 114 may be disposed proximate to (or embedded within) a composite leading edge of an aircraft component (such as an airplane wing or unmanned aerial vehicle airfoil or wing) with respect to a direction of flight of the aircraft.

In practice, the system 100 functions to inhibit and/or prevent the deposit of ice and/or functions to remove existing ice, from the component 120, by vibration of the component 120 accomplished with the actuation of one or more of the actuator/s 114. Actuation of one or more of the actuator/s 114 may be controlled by the control unit 102 via signaling received via the coupling 112. By way of example, the wave generator 106 can generate a signal at a desired frequency for use in vibrating the one or more actuator/s 114 causing actuation of the component 120. More specifically, when the signal of wave generator 106 is received by the amplifier 108 (and amplified using power source 110), the resulting amplified signal is then input to the coupling 112 and then received by the one or more actuator/s 114. In some embodiments, receipt of a periodic signal by the one or more actuator/s 114 will result in actuation of the one or more actuator/s 114 causing a transfer of mechanical energy into the component 120. In some embodiments, this transfer of mechanical energy provides a displacement of a portion of the component in three dimensions which inhibits the formation of ice (or other debris) and/or breaks up and removes existing ice formed on the portion of the component surface.

In accordance with some embodiments, the one or more actuator/s 114 will be disposed on the component 120 (e.g., the leading edge of an airfoil/aircraft wing with respect to a direction of flight). Upon receipt of signaling from the coupling 112, the one or more actuator/s 114 will be actuated at a frequency determined by the wave generator 106, resulting in a transfer of vibrational mechanical energy, in three dimensions (e.g., x, y and z directions), into the surface of the component 120. By way of example, the one or more actuator/s 114 can be positioned relative to the component 120 such that actuation of the one or more actuator/s 114 will cause in-plane, out-of plate bending to occur in the surface of the component 120 (i.e., deformations in three dimensions including transverse and longitudinal directions).

In some embodiments, the actuation of the one or more actuator/s 114 may be used to at least partially inhibit the formation of ice on a surface of the component 120 (e.g., an aircraft wing) and/or for use in removing ice that has already deposited on the surface of the component 120. As would be appreciated by one of skill in the art, ice is only one form of debris for which embodiments the invention may be used; however, accretions other types of debris (such as, but not limited to, dirt and oil) may also be removed and/or inhibited using some embodiments of the invention. Additionally, as would be appreciated by one of skill in the art, some methods and applications of embodiments of the invention may be applied to a component or surface that is not part of an aircraft.

In some embodiments, the actuation frequency of the one or more actuator/s 114 will be controlled by the microcontroller 104 based on feedback received from the sensor 122. That is, the control unit 102 can be configured such that the control unit 102 is coupled to at least one sensor (such as the sensor 122 of FIG. 1) and configured to switch a driving frequency of the one or more actuator/s 114 based on signaling received from the sensor 122. Alternatively, in some embodiments the control unit 102 may be configured to drive the one or more actuator/s 114 automatically (and independent of) signaling received from the sensor 122.

By way of example, the sensor 122 may sense/detect the operational or resonant frequency along one or more location/s of the component 120. This measured resonant frequency of the component 120 may then be used by the microcontroller 104 to tune the frequency of the signal generated by the wave generator 106. In turn, the control unit 102 will actuate the one or more actuator/s 114 at a frequency at, or near, the resonant/operational frequency of the component 120 (at or near their respective locations). The operational or resonant frequency of a position along the component 120 may be affected by many factors, including but not limited to the mass, composition and/or the geometry/shape of the component 120.

Additionally, in some embodiments, at least one sensor (e.g., the sensor 122) will be coupled to one or more actuators (e.g., the one or more actuator/s 114) and configured to sense an impedance of the one or more actuator/s 114 when the actuator is being driven by the control unit 102. Similarly, in some embodiments, the control unit 102 can be configured to drive the one or more actuator/s 114 at a predetermined power consumption rate such that the actuators do not exceed the predetermined power threshold. By way of example the one or more actuator/s 114 may be driven in such a manner so as not to exceed a specific power to surface area ratio.

In some embodiments, actuation of the one or more actuator/s 114 at the resonant frequency of the component 120 will more effectively remove and/or prevent the formation of ice on the surface of the component 120, than would actuation at other, non-resonant, frequencies. In some embodiments, actuation of the one or more actuator/s 114 will be effective for removing ice deposits/preventing ice formation on the component 120 surface when actuated at lower frequencies, for example, between 1 Hz and 1 kHz. In some embodiments, actuation of the one or more actuator/s 114 will be effective for removing ice deposits/preventing ice formation on the component 120 when actuated at a frequency between 10 Hz and 500 Hz. In some embodiments, actuation of the one or more actuator/s 114 will be effective for removing ice deposits/preventing ice formation on the component 120 when actuated at between 55 Hz and 235 Hz. In some embodiments, actuation of the component 120 surface in the lower frequency ranges will not only reduce power consumption (relative to actuation at high frequencies) but will more effectively displace the component 120 surface, effectively removing and preventing the accretion of ice (or other debris). Thus, in some forms, lower mass or weight components can be provided relative to higher frequency systems.

Figures 2, 3:
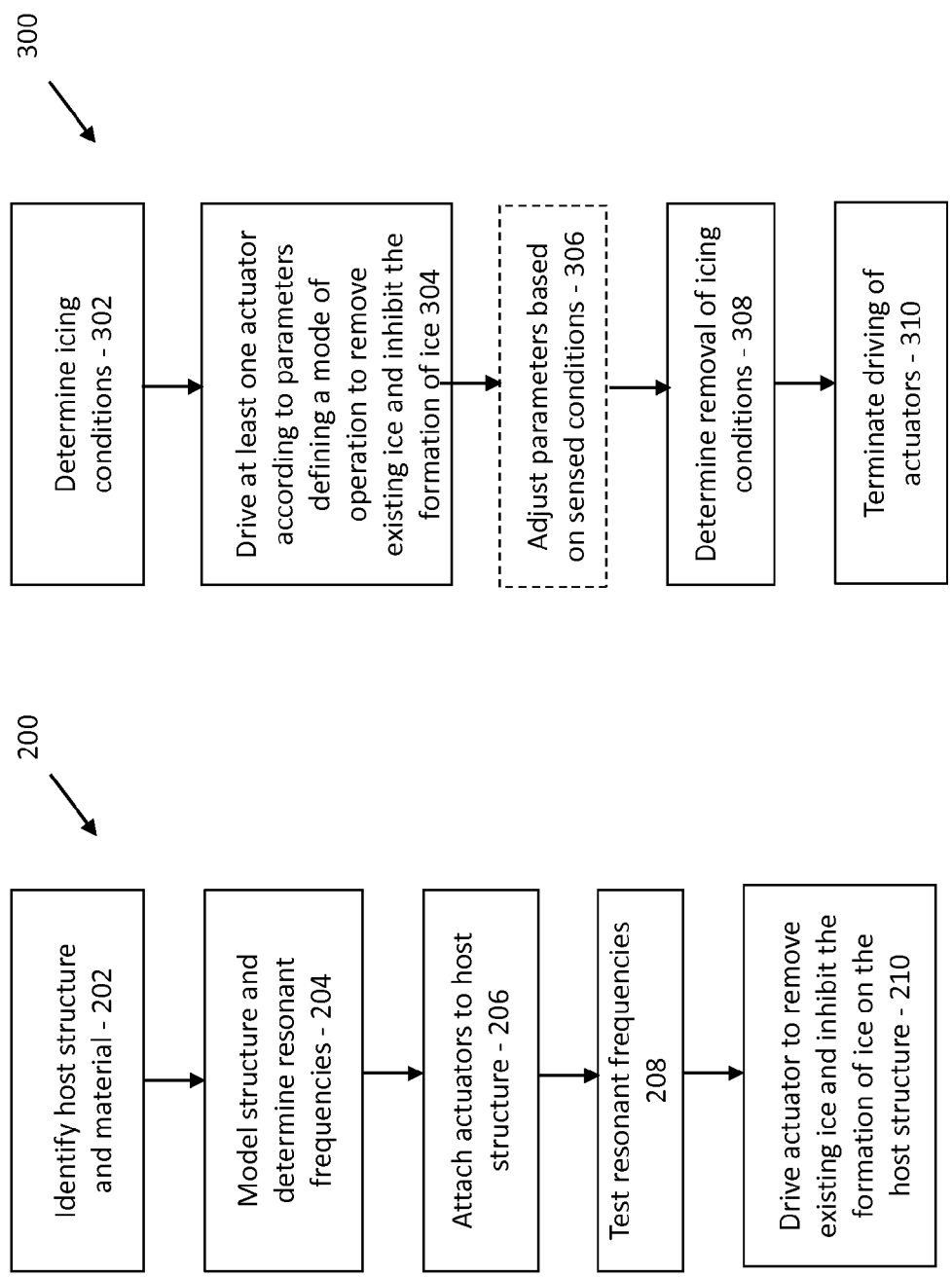
FIG. 2 is a flowchart depicting a method for designing a component of an aircraft for use in removing existing ice and/or inhibiting the formation of ice on the component in accordance with an embodiment of the invention.
FIG. 3 is a flowchart depicting a method for inhibiting and/or removing ice from a component of an aircraft in accordance with yet another embodiment of the invention.

Referring next to FIG. 2, a flowchart is shown that depicts a method for designing a component of an aircraft for use in removing existing ice and/or inhibiting the formation of ice on the component, in accordance with one embodiment of the invention. This method will be described with occasional reference to the de-icing system depicted by FIG. 1; however, it is to be understood that the method 200 is not limited to the depicted system of FIG. 1, or any other system.

The method 200 begins with step 202 which entails identifying the component and material. In some embodiments, identification of the component and material will include identifying the surface shape and/or composition of the component. Identification of the component may further involve identifying the shape and/or temperature of an aircraft surface structure that is (or will be) exposed during flight of the aircraft. In some embodiments, the component will comprise the leading edge of an aircraft component with respect to a direction of flight, e.g., the leading edge of an aircraft wing etc.

In step 204, the component is modeled and the resonant frequencies of the component are determined. In some embodiments, the resonant frequencies of the component may be determined using one or more sensors, for example similar to the sensor 122 described above with respect to FIG. 1. In one embodiment, the model of the component is used to determine the resonant frequency of the surface of the component, which may be a function of one or more variables including, but not limited to, the shape/geometry of the component's surface and/or the material composition of the component etc.

As would be appreciated by one of skill in the art, there may be several ways to model a component and/or component surface in order to determine one or more resonant frequencies. For example, in some embodiments, the approximate resonance of a component and/or component surface may be determined by attaching one or more actuators to the component/component surface and performing a vibrational analysis (e.g., using Finite Element Analysis) to determine one or more resonance frequencies of the component and/or component surface.

In some embodiments, resonance frequencies of a component and/or component surface may be determined using a sensor (e.g., the sensor 122 as discussed above in the system 100 of FIG. 1) for running a constant impedance analysis in the desired frequency zones. By way of example, sensors (such as the sensor/s 122) may be attached to the component and used to determine the impedance of the component as the frequency is operated at between 1 Hz and 1 kHz. In some embodiments, the sensors attached to the component and/or component surface may perform constant impedance analysis of the component and/or component surface as the one or more actuators are actuated at one or more frequencies of actuation between 10 Hz and 500 Hz. In some embodiments, the sensors attached to the component may perform constant impedance analysis of the component and/or component surface as the one or more actuators are actuated at one or more frequencies of actuation between 55 Hz and 235 Hz.

In some embodiments, the structural resonance of a component and/or component surface may be determined using one or more actuators and/or accelerometers and actuator resonance may be determined using an impedance measurement. However, as would be appreciated by one of skill in the art, the component resonance will change when one or more actuators are coupled to the component surface.

In step 206, one or more actuators are attached to the component. In some embodiments, the actuators will be attached an inner surface of the component. For example, the component may comprise an inner facing portion (e.g., an airfoil like such as an aircraft wing) and the actuators may be attached to either the outer facing or inner facing surfaces of the air foil. However, in some embodiments, the actuators will be attached to the inner facing surfaces at regularly spaced intervals and/or one or more actuators may be positioned within a composite material, as will be discussed in further detail below.

Furthermore, in some embodiments the actuators will be mechanically disposed on a surface of the component such that actuation of the actuators will mechanically displace the component in an out-of-plane (three-dimensional) motion without causing structural damage to the component. By way of example, the actuators may be disposed on the component such that actuation will cause a three dimensional force to be transferred to the surface of the component.

One or more actuators (e.g., the one or more actuators 114 of FIG. 1) may be disposed on the component in essentially any arrangement, depending on embodiment. In some embodiments, a plurality of actuators may be arranged on the component in a pattern extending across at least a portion of the component's surface. As will be discussed in further detail below with respect to FIG. 12, in some embodiments, a plurality of actuators may be arranged in a plurality of zones on the component, wherein each zone corresponds to a respective region of the component's surface.

In step 208, the one or more determined resonant frequencies of the component (as determined in step 204) are tested by actuating the actuators attached in step 206, as will be discussed in further detail with respect to FIG. 8, below. In some embodiments, the relative resonant frequencies of the component will vary by location on the component. Thus, in some embodiments, each actuator will be actuated at (or near) the frequencies corresponding to the resonant frequencies of the component at that respective actuator's position on the component.

In step 210, one or more of the actuators will be actuated (driven) to remove existing ice from the component and/or to inhibit the accretion of new ice deposits on the component. In some embodiments, this is done to verify that the device will actually work before put into operational use. In practice, the actuators may be actuated/driven for essentially any duration of time and in any pattern; however, in some embodiments the actuators will be actuated for a duration ranging between 0.001 seconds and 10 seconds, e.g., in the interest of minimizing power consumption. In some embodiments, the actuators will be actuated at one or more frequencies of actuation between 1 Hz and 1 kHz. In some embodiments, the actuators will be actuated at one or more frequencies of actuation between 10 Hz and 500 Hz. In some embodiments, the actuators will be actuated at one or more frequencies of actuation between 55 Hz and 235 Hz.

FIG. 3 is a flowchart depicting a method 300 for inhibiting and/or removing ice from a component of an aircraft in accordance with yet another embodiment of the invention. Although, this method will be described with occasional reference to the de-icing system (e.g., the system 100 depicted in FIG. 1), but it should be understood that the disclosed method is not limited to the system 100, or any other system.

The method 300 of FIG. 3 begins with determining icing conditions, as depicted in step 302. In some embodiments, the determination of icing conditions is made with respect to the icing conditions on an outer facing surface of the component. In some embodiments, this determination may be made using one or more sensors such as the sensors 122 depicted in FIG. 1. Furthermore, icing conditions may be determined using a variety of other sensors; by way of example, this determination may be based on, but is not limited to, information received from one or more temperature, altitude, humidity, wind speed and/or moisture sensors etc.

In step 304, one or more actuators are driven (actuated) according to parameters defining a mode of operation to remove existing ice and/or to inhibit the formation of ice on the surface of the component. Actuation of the actuator results in a displacement of the surface in three dimensions to inhibit a formation of ice on at least the portion of the surface and/or to break up existing ice formations on at least the portion of the surface. In some embodiments, the actuators will be driven at one or more frequencies of actuation between 1 Hz and 1 kHz. In some embodiments, the actuators will be driven at one or more frequencies of actuation between 10 Hz and 500 Hz. In some embodiments, the actuators will be driven at one or more frequencies of actuation between 55 Hz and 235 Hz.

In some embodiments, the mode of operation will be controlled by a control unit such as the control unit 102 illustrated in the block diagram of FIG. 1 (above). By way of example, the control unit 102 may receive, from one or more sensor devices, an indication that ice has formed on a component such as the component 120 depicted in FIG. 1. Receipt of a positive ice formation indication may originate from one or more sensors, such as the sensor 122 depicted in FIG. 1, or alternatively, may originate from one or more sensor/s and or indication means external to (and not depicted by) the system 100 of FIG. 1.

Alternatively, in some embodiments one or more sensors may be used to indicate the existence of conditions under which the likelihood of ice formations would be increased. By way of example, one or more sensor/s may detect conditions (e.g., altitude, temperature and or humidity) under which ice accretions may form. Given such an indication, one or more of the actuator/s 114 can be actuated to at least partially inhibit or prevent ice formation. By way of example, the control unit 102 of the system 100 of FIG. 1 may receive an indication that ice has already formed, or is likely to form, on a surface of the component 120. Based on this indication, the control unit 102 can drive the one or more actuators 114 via coupling 112.

In some embodiments, actuation of the actuators (e.g., the one or more actuators 114 as depicted in FIG. 1) may occur simultaneously. In other embodiments, the microcontroller 104 may control the actuation of different actuators such that the actuators are actuated according to a pattern. For example, the microcontroller may activate the one or more actuators 114, so that actuation occurs in stages e.g., in essentially any "sweeping" pattern, depending on actuator arrangement.

In some embodiments, wherein the plurality of actuators are arranged on the component in a plurality of zones, the control unit (e.g., the control unit 102 of FIG. 1) may be configured to selectively drive the plurality of actuators of each of the plurality of zones in time relative to the others of the plurality of zones.

Furthermore, in some embodiments, the frequency of the output signal generated by the wave generator 106 may be varied in order to cause a corresponding variation in the frequency of actuation e.g., in the one or more actuators 114. Thus, a control unit (e.g., the control unit 102 of FIG. 1) may be used to vary the speed of actuation (i.e., to control frequency "sweeping") of one or more of the plurality of actuators, such as the one or more actuators 114 of FIG. 1.

Additionally, actuation of the one or more actuators on the component may occur simultaneously or may be performed in phases such that some actuators are activated at different time intervals and for different durations of time with respect to other of the actuators. In some embodiments, actuation of individual actuators will occur in stages, so as to "sweep" the surface of the component. For example, driving frequencies may be adjusted based on impedance measurements from one or more sensors, such as the sensors 122 discussed above with respect to FIG. 1. Additionally, in some embodiments the control unit (e.g., the control unit 102 of FIG. 1) may drive actuation of two or more of the plurality of actuators in time, in a sequence relative to each other, such that actuation of the actuators occurs in a specific pattern.

In some embodiments, wherein the plurality of actuators are arranged by zones, actuation may be driven on a zone by zone basis. For example, the control unit may be configured to selectively (and simultaneously) drive a plurality of actuators wherein the actuators are grouped into different zones (corresponding to different regions on the component) such that the actuators of each of the plurality of zones are driven sequentially in time relative to the actuators of the other zones.

In some embodiments, a control unit (e.g., the control unit 102 of FIG. 1) may be configured to control actuation of one or more of the actuators at one or more predetermined frequencies. For example, the control can be configured to selectively drive one or more of the actuators at a plurality of predetermined frequencies within a predetermined time period, or may be configured to "sweep" over a range of frequencies. For example, a control unit (such as the control unit 102 of FIG. 1) may be configured to selectively drive two or more of the plurality of actuators in time in a sequence relative to each other, the two or more of the plurality of actuators arranged in a pattern extending from one portion of the surface in a linear sweep to another portion of the surface.

In optional step 306, the control unit parameters affecting actuation frequency and actuation pattern/location may be adjusted based on one or more sensed conditions. By way of example, one or more sensors (e.g., the sensor 122 as depicted in FIG. 1) may send signals back to the control unit related to present or changing conditions of the component. For example, driving frequencies may be adjusted based on impedance measurements from the sensors 122.

In some embodiments, the resonant frequencies of the component may change as the component is acted upon by outside forces (e.g., wind, water, thermal expansion/compression, etc.). For example, the sensed conditions of the component may pertain to whether or not ice accretions are built up on a surface of the component and actuation parameters may be adjusted based on the amount of ice buildup or on the basis of other factors such as temperature, humidity, wind speed, moisture level, pressure and/or the geometric characteristics and/or shape of the component, etc. In some embodiments, adjusted parameters will enable the control unit to actuate one or more actuators in a manner that is more effective for the removal of ice, or prevention of ice formation, on the component (e.g., actuation at the component's resonant frequency). After one or more actuators have been actuated to remove and/or inhibit the formation of ice on the component, the method proceeds to step 308.

In step 308 the removal of icing conditions is determined. The removal of icing determination may be made by one or more sensors (e.g., the sensor 122 as depicted in FIG. 1). Alternatively, in some embodiments, the determination of de-icing may be made with other sensors or detection means not depicted in the system 100 of FIG. 1. For example, at known altitudes and temperatures, icing conditions may not be known to occur, however icing conditions may be determined by altimeter and/or temperature data from other parts of the aircraft. Upon, determining that ice has been adequately removed from the component, the method 300 proceeds to step 310 wherein the driving of the one or more actuators is terminated.

FIG. 4 illustrates a component 400 comprising an inner surface 402, an outer surface 404 and a plurality of actuator strips 406. In some embodiments, one or more of the plurality of actuator strips 406 will be disposed on the component's inner surface 402. In some embodiments, the actuator strips 406 will be comprised of a flexible material that will be capable of substantially conforming to a curved surface, such as the curved surface of an aircraft component. For example, in some embodiments, the actuator strips 405 may comprise a Macro Fiber Composite such as part number M8557P1 made by Smart Material Corporation of Sarasota, Fla. (see also http://www.smart-material.com/MFC-product-main.html, which is incorporated herein by reference).

Figure 6:
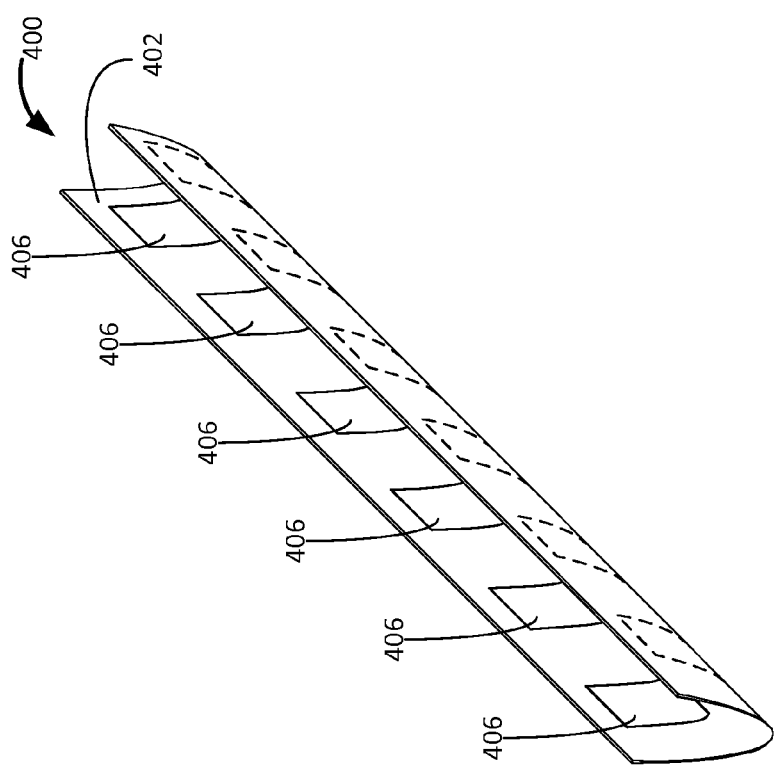
FIG. 6 is a perspective view of a component of an aircraft with a plurality of actuators disposed on the inner surface in accordance with an embodiment of the invention.

Although FIG. 4 illustrates three (shown) actuator strips 406 at regularly spaced intervals, there may be essentially any number of actuator strips which may be arranged on (or proximate to) the component's inner surface 402 in virtually any pattern. For example, FIG. 6 illustrates a component 400 with (six shown) actuator strips 406 disposed on the inner surface 402 of the component 400.

In some embodiments the actuator/s and/or actuator strip/s will be spaced in such a manner so as to provide optimal performance and reliability while still minimizing the number of actuators required. Furthermore, the spacing of one or more actuators and/or actuator strips may be unique to each component, depending on how the component behaves at each resonance mode.

In some embodiments, each of the plurality of actuator strips will comprise one or more actuators. As discussed above, the component 400 may be composed of an isotropic or composite material; however, in some embodiments the component 400 will form an airfoil, such as the leading edge of an aircraft component with respect to the an aircraft direction of flight (e.g., the leading edge of an aircraft wing). However in alternative embodiments, the component 400 may form essentially any aircraft component or structure including, but not limited to: an aircraft tail, an aircraft rudder, an aircraft control surface such as a flap or an elevator, a wind turbine blade, a helicopter rotor blade and/or a refrigeration coil cooling fin etc.

In practice, when one or more of the plurality of actuators is driven within one or more of the actuator strips 406, a force will be exerted in three dimensions relative to the surface plane of the component 400. For example, when one or more of the actuator strips 406 are actuated, a force will be imparted upon the inner surface 402 of the component 400 causing a mechanical displacement in the component 400 in three dimensions (i.e., transverse and longitudinal directions).

Figure 7:
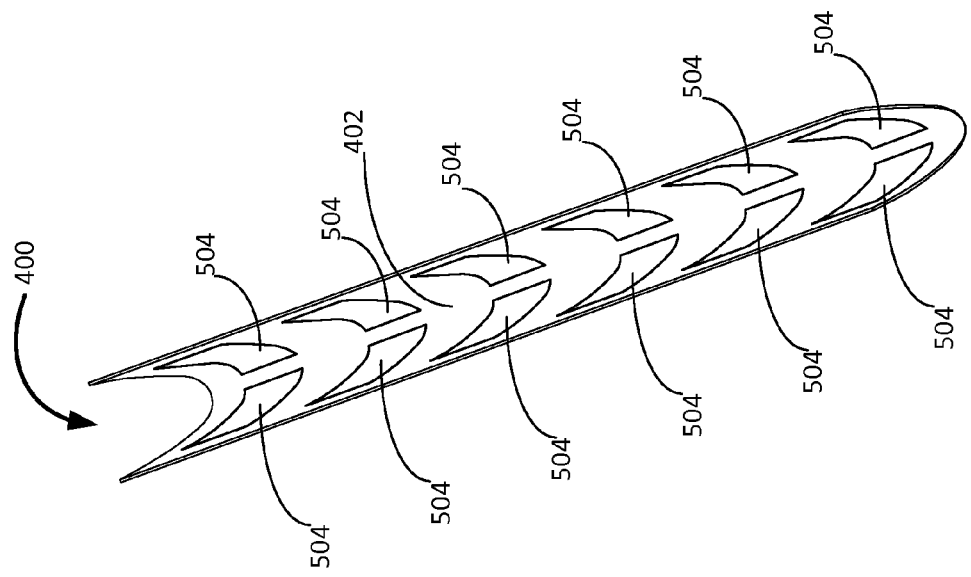
FIG. 7 is yet another perspective view of a component of an aircraft with a plurality of actuators disposed on the inner surface in accordance with an embodiment of the invention.

FIG. 5 illustrates a component 400 comprising an inner surface 402. The component 400 further includes six actuator strips 504 disposed at regular intervals on the inner surface 402 of the component 400, according to some embodiments of the invention. However, in some embodiments, a greater (or lesser) number of actuators may be disposed on the outer surface of the component and may be positioned in virtually any pattern or arrangement. For example, FIG. 7 illustrates a component 400 comprising twelve actuator strips 504 disposed on an inner surface 402 of the component 400.

Figure 8:
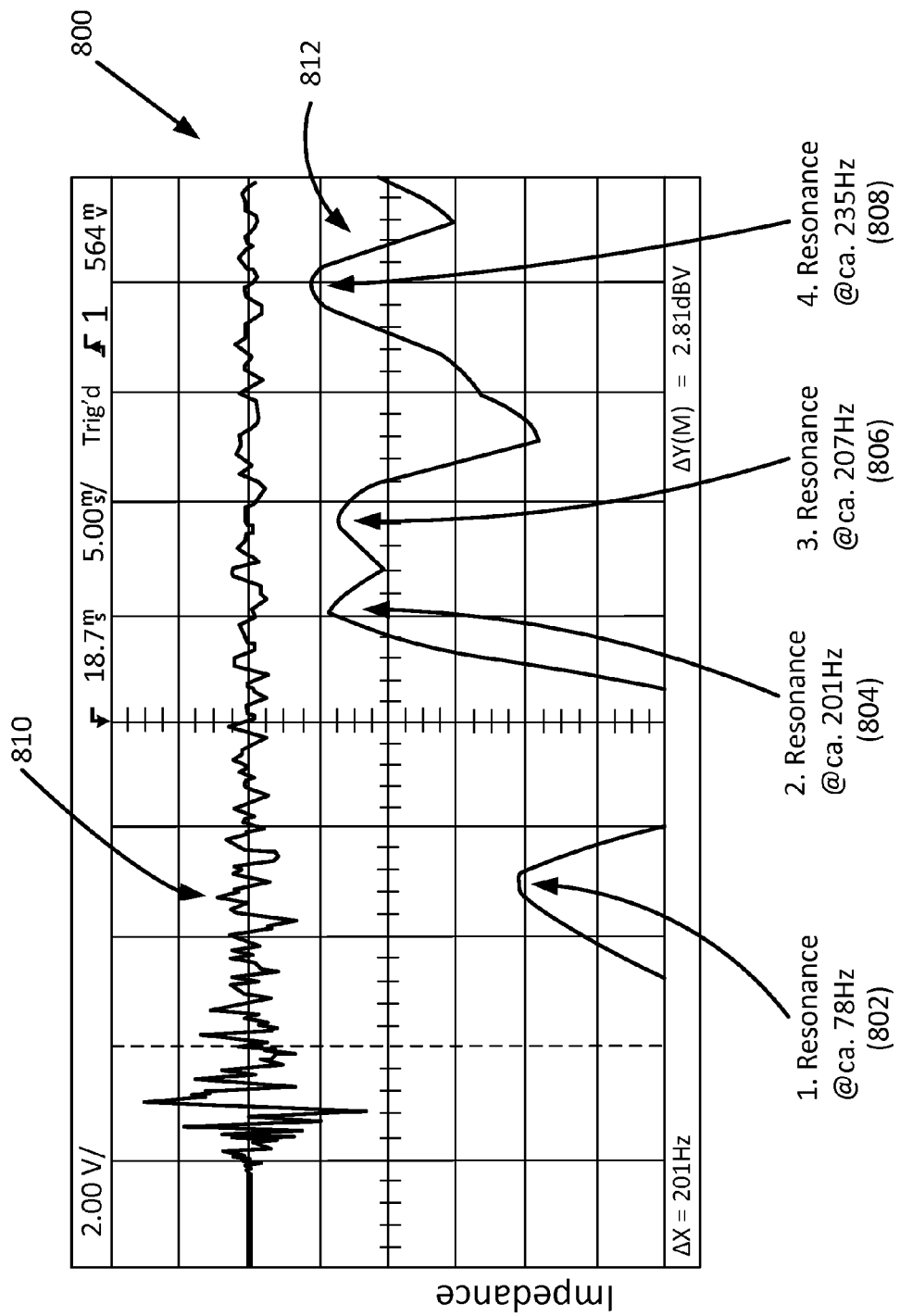
FIG. 8 is a graph of impedance vs. frequency that depicts multiple resonant frequencies of a component of an aircraft according to some embodiments of the invention.

Referring next to FIG. 8, which illustrates a graph 800 of impedance vs. frequency is shown depicting resonance points (i.e., modes) 802, 804, 806 and 808 of a component, over varying frequencies (x-axis). The impedance is in units of decibel Volts (dBV). An input signal 810 applied to the component is shown and the resulting impedance output signal 812 is displayed. The peaks of the output signal 812 are the points of lowest relative impedance such that each peak corresponds to a resonant frequency of the component. By way of example, the output signal 812 illustrates that the component has a first resonance point 802 at a frequency of about 78 Hz; a second resonance point 804 at a frequency of about 201 Hz; a third resonance point 806 at a frequency of about 207 Hz; and a fourth resonance point 808 at a frequency of about 235 Hz.

In practice, once the resonant frequencies have been determined, one or more actuators may then be driven at, or near, a determined resonance frequency of the component in order to cause maximal in-plane, out-of-plane bending/deformation, resulting in at least the partial removal of ice accretions and/or at least partially inhibiting the formation of new ice on the surface of the component.

Figure 9:
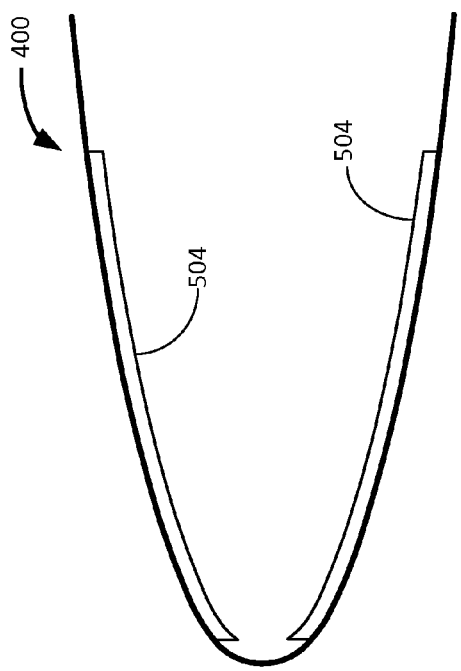
FIG. 9 is a side profile view of a component cross section, in accordance with some embodiments of the invention.

FIG. 9 illustrates a cross-sectional side-perspective view of a component 400 together with actuator strips 504 disposed on the inner surface of the component 400. As discussed above, when the one or more of the actuator strips 504 are driven (actuated), a three dimensional bending/deformation will result in the surface of the component 400. In some embodiments each strip could contain only a single actuator element; however, in some embodiments, each of the actuator strips will contain a plurality of actuators. For example, FIG. 10 illustrates a single actuator strip 1000 connected to a driving power source 1002 and a plurality of (fourteen total) actuators 114.

Figure 10:
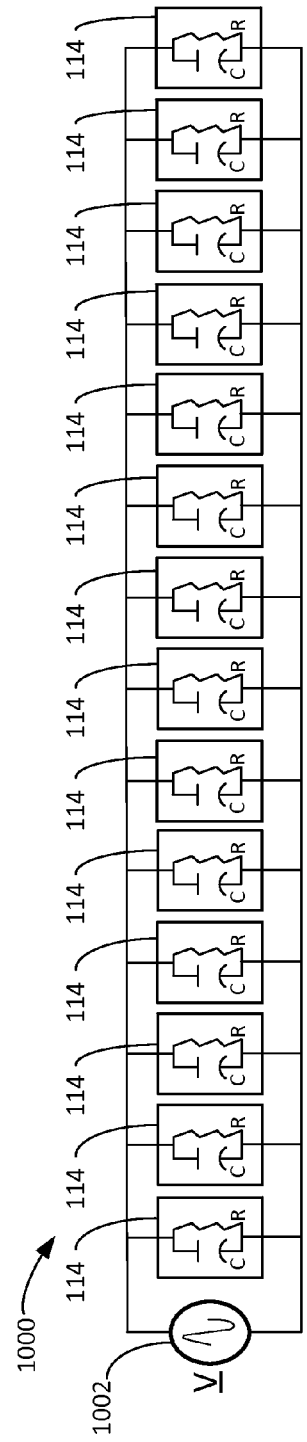
FIG. 10 is a schematic diagram of an actuator strip in accordance with an embodiment of the invention.

Although the plurality of actuators 114 depicted in FIG. 10 totals fourteen, a greater or lesser number of actuators may be disposed in a single actuator strip. As illustrated, the plurality of actuators 114 are connected, in parallel, to the power source 1002.

In practice, each actuator element of the plurality of actuators 114 may be modeled as an RC circuit; thus, in some embodiments of the invention the plurality of actuators may be modeled as a capacitive element.

Figure 11:
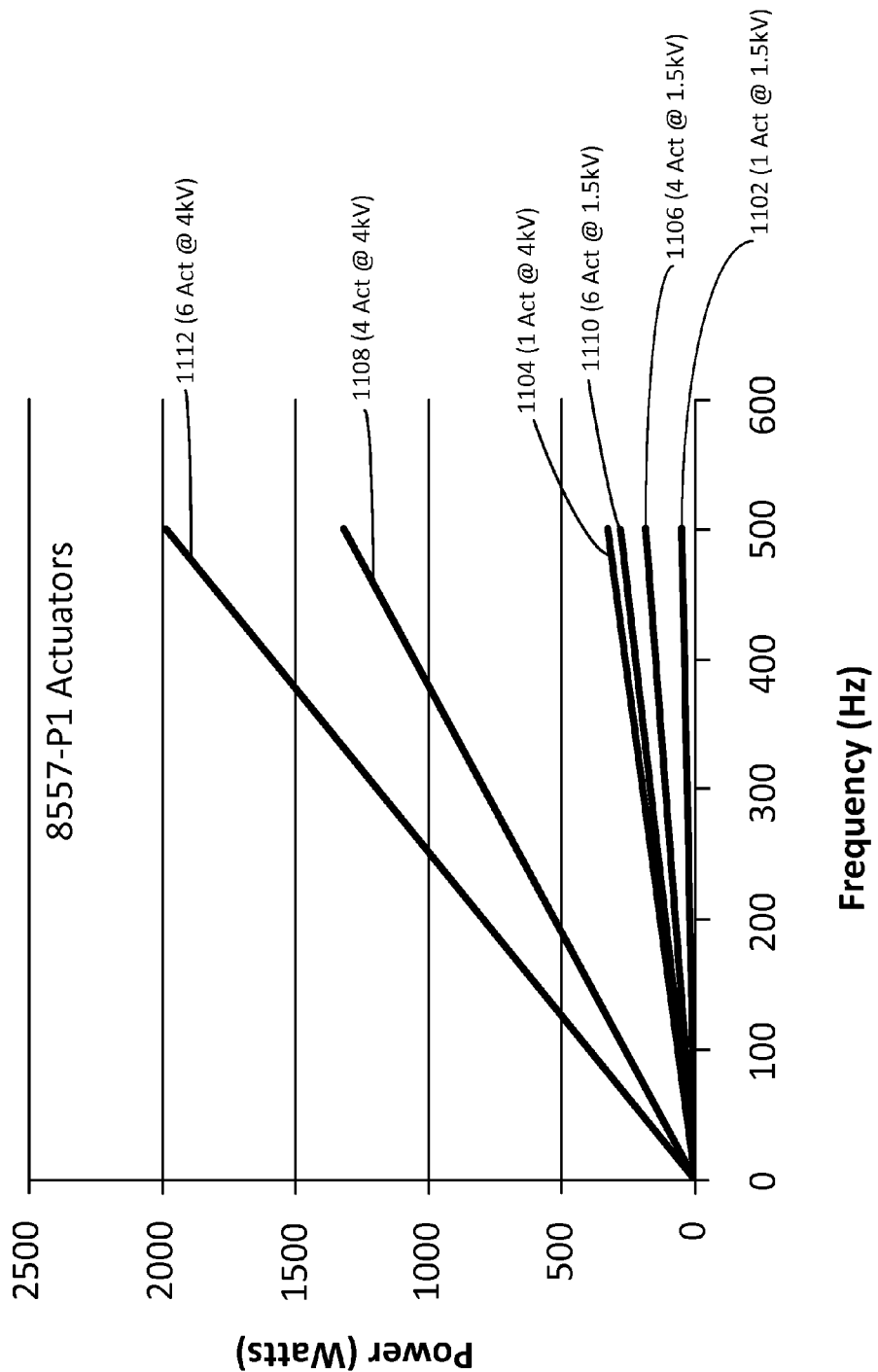
FIG. 11 is a graph depicting actuator power consumption with respect to frequency, in accordance with some embodiments of the invention.

FIG. 11 illustrates a graph 1100 of the power consumption in watts (y-axis) of one or more actuator elements with respect to frequency (x-axis). For example, the graph 1100 depicts the power consumption with respect to frequency of a single actuator element driven at 1.5 kV 1102; a single actuator element driven at 4 kV 1104; four actuator elements driven simultaneously at 1.5 kV 1106; four actuator elements driven simultaneously at 4 kV 1108; six actuator elements driven simultaneously at 1.5 kV 1110; and six actuator elements driven simultaneously at 4 kV 1112. The power consumption at a given frequency (illustrated in the lines of FIG. 11) can be appreciated by those of skill in the art, through the relationship between a sine wave input and the impedance (Z) of a component according to Equation (1):

$$Z = \frac{1}{2\pi f} \sum_{i=1}^{n} C_i$$

where Z=impedance (ohms) of the component, f=frequency (Hz) and C=capacitance of the actuator (farads). Furthermore, as would be appreciated by those of skill in the art, the peak power (Ppk) of a component can then be calculated using Equation (2):

$$P_{pk} = \frac{V^2}{Z}$$

where $P_{pk}$=peak power (watts); Z=the impedance calculated in Equation 1 (ohms) and V=the maximum positive voltage (volts). Finally, the RMS power can be calculated using Equation (3):

$$P_{rms} = \frac{1}{\sqrt{2}} P_{pk}$$

where $P_{rms}$=power (watts) and $P_{pk}$=peak power from Equation 2 (watts). In some embodiments, the voltage of the input signal is known and the impedance is measured, such that the peak and rms power can be calculated using Equations (2) and (3). The power illustrated in FIG. 11 is the rms power, $P_{rms}$.

Although one or more actuator elements may be driven in essentially any pattern in a wide ange of frequencies, in some embodiments actuators will be driven in a manner that most effectively removes and/or inhibits ice accretion while also minimizing the number of actuators required and the amount of power consumed consumption. In some embodiments, actuation of one or more actuator/s (e.g., the actuators 114 of FIG. 1, above) will be effective for removing ice deposits/preventing ice formation on a component surface when actuated at one or more frequencies, for example, between 1 Hz and 1 kHz. In some embodiments, actuation of the one or more actuator/s 114 will be effective for removing ice deposits/preventing ice formation on the component 120 when actuated at one or more frequencies between 10 Hz and 500 Hz. In some embodiments, actuation of the one or more actuator/s 114 will be effective for removing ice deposits/preventing ice formation on the component 120 when actuated at one or more frequencies between 55 Hz and 2435 Hz.

Figure 12:
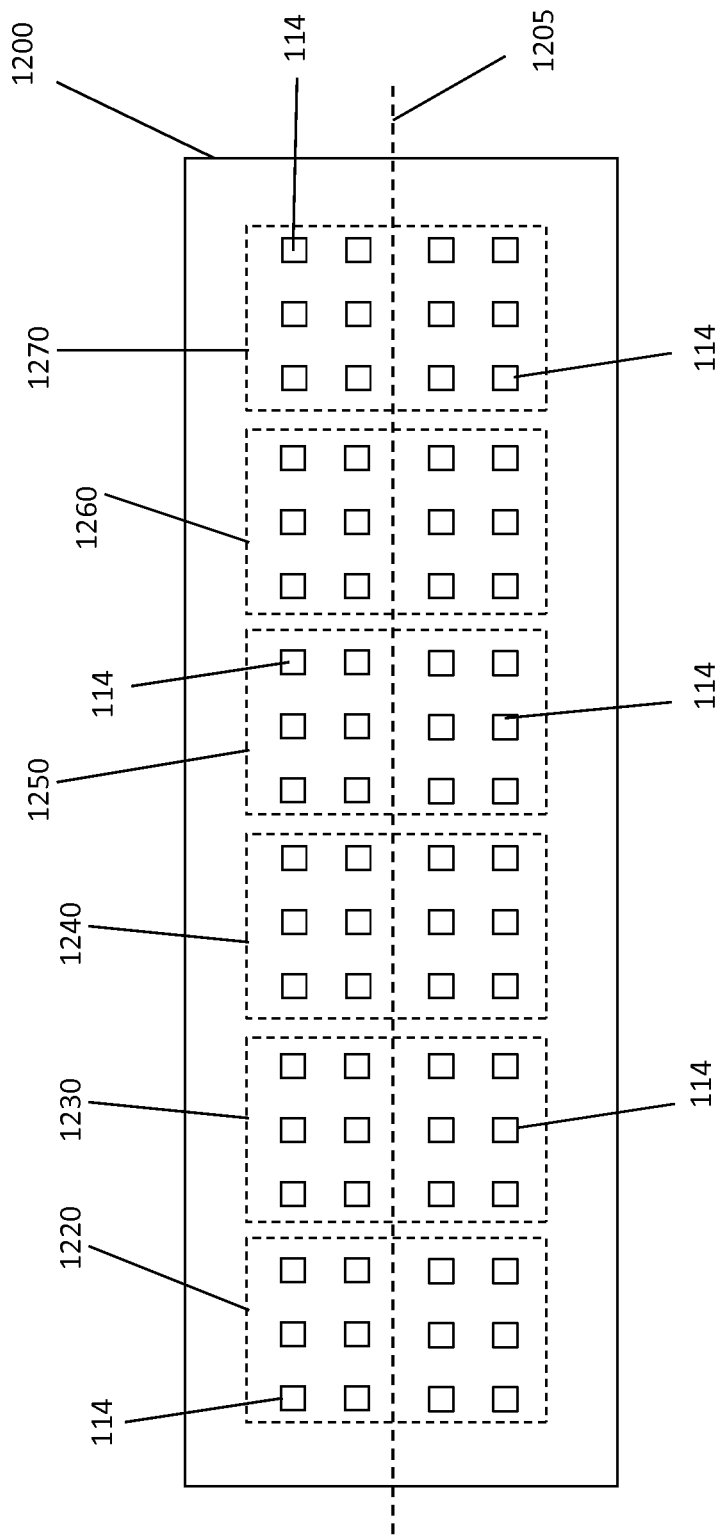
FIG. 12 depicts a plurality of actuator devices grouped into zones, in accordance with some embodiments of the invention.

Referring next to FIG. 12, which illustrates a component surface 1200, an airfoil center line 1205, a plurality of individual actuators 114 arranged in a total of six zones 1220, 1230, 1240, 1250, 1260 and 1270. Although FIG. 12 illustrates the division of the individual actuators 114 into six zones (1220, 1230, 1240, 1250, 1260 and 1270), one of skill in the art would appreciate that one or more zones may be arranged to include any (or all of) the individual actuators 114 and that the zones may be arranged in essentially any pattern or design on the component surface 1200. For example, the individual actuators 114 could be separated into different zones with respect to the airfoil center line 1205. Additionally, one or more zones may be arranged to include two or more of the individual actuators 114, irrespective of whether or not the two or more actuators are adjacently located on the component surface 1200.

In practice, a control unit (not shown) can be configured to drive actuation of the actuators of any particular zone at a specific time and/or over a constant or varying frequency range. For example, a control unit (e.g., the control unit 102 as depicted in FIG. 1) may be configured to selectively drive each actuator for a time period of between about 0.001 seconds to 10 seconds. In another example, the control unit may be configured to selectively drive each actuator for a time period corresponding to between about 1 to 10 periods of a sinusoidal, triangle, square, and pulse wave of a driving frequency.

By way of further example, a control unit (e.g., the control unit 102 as depicted in FIG. 1) may drive zone activation such that the actuators are driven in a "sweeping" motion from left to right across the component surface 1200. For example, the control unit 102 may drive the individual actuators 114 of zone 1220, and then successively drive the individual actuators 114 of remaining zones 1230, 1240, 1250, 1260 and 1270. In some embodiments, actuation of the individual actuators 114 associated with a particular zone may overlap in time with actuation of the individual actuators 114 of a different zone. In some embodiments, the actuation of the individual actuators 114 of a particular zone will not overlap in time with the actuation of the individual actuators 114 of another zone.

In some embodiments, actuation of individual zones may occur in a pattern that skips one or more adjacent zones. For example the control unit 102 may successively drive the individual actuators 114 of zones 1220, 1240, 1260 and then successively drive the individual actuators 114 of remaining zones 1230, 1250, 1260 and 1270. By way of another example, the control unit 102 may successively drive the individual actuators 114 of zones 1240, 1230 and 1220 while simultaneously and successively driving the individual actuators 114 of zones 1250, 1260 and 1270. As such, the control unit may be configured to selectively drive at least two adjacent actuators of the plurality of actuators at sequential times. Alternatively the control unit may be configured to sequentially drive at least two non-adjacent ones of the plurality of actuators at sequential times.

In some embodiments, the control unit 102 will be configured to drive the actuation of the individual actuators 114 associated with different zones at an essentially constant frequency. By way of example, the control unit may be configured to drive each zone at one or more frequencies corresponding to one or more determined resonance frequencies of a proximately located component.

In some embodiments, the control unit may be configured to drive different zones at different frequencies or to drive actuation over a range of frequencies with respect to a unit of time. By way of further example, a control unit may be configured to drive the individual actuators 114 of zones 1220, 1230 and 1240 at a first frequency corresponding to a first mode/resonance frequency of the component, wherein the individual actuators 114 associated with the zones 1250, 1260 and 1270 will be driven at a second mode/resonance frequency of the component.

One of skill in the art should appreciate that zone activation may occur in virtually any pattern with virtually any combination of activation durations. However, in some embodiments the zone boundaries, zone activation sequence (and duration) and zone actuation frequency variation will be controlled in such a manner so as to effectively remove and/or inhibit the formation of ice on the component surface while minimizing power consumption and total actuator count. As would be appreciated by one of skill in the art, generally less power will be consumed when actuating one or more actuators at lower frequencies, as opposed to actuating the same actuators at high frequencies (e.g., ultrasonic frequencies). Furthermore, as would also be appreciated by those of skill in the art, actuation of one or more actuators at (or near) the resonant frequencies of a component surface will induce greater displacement in the component surface, per unit of power, relative to actuation at non-resonant frequencies of the component surface. Additionally, as would be further appreciated by one of skill in the art, in some embodiments, driving actuation of one or more zones successively in time will consume less power than driving actuation of all actuators simultaneously; thus, the ability to control actuation by zone will yield greater control over the power output that need be expended, and will potentially reduce the size of the power supply necessary to carry out some embodiments since less power will be required at any given point in time.

Figure 13:
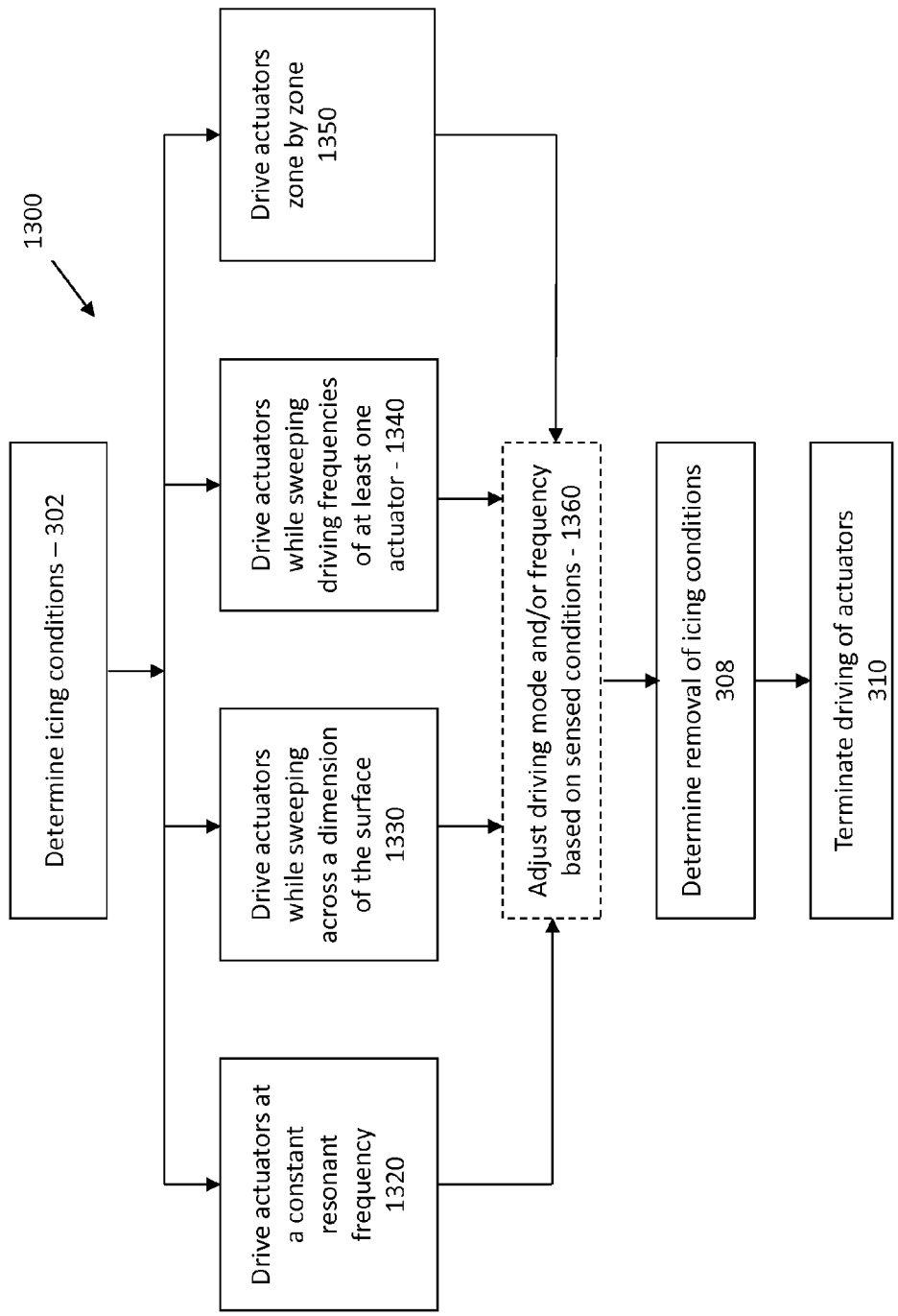
FIG. 13 is a flowchart depicting a method for inhibiting and/or removing ice from a component of an aircraft in accordance with other embodiments of the invention.

FIG. 13 illustrates a flowchart depicting a method for inhibiting and/or removing ice from a component of an aircraft in accordance with other embodiments of the invention. The method 1300 begins with determining icing conditions, as depicted in step 302. In some embodiments, the determination of icing conditions is made with respect to the icing conditions on an outer facing surface of the component. In some embodiments, this determination may be made using one or more sensors such as the sensors 122 depicted in FIG. 1. Furthermore, icing conditions may be determined using a variety of other sensors; by way of example, this determination may be based on, but is not limited to, information received from one or more temperature, altitude, humidity, wind speed and/or moisture sensors etc. In some embodiments, the icing conditions of a surface of the component may be based, at least in part, on a measured impedance of a surface of the component.

Steps 1320, 1330, 1340 and 1350 provide embodiments of example methods of driving actuators; for example, they provide examples of step 304 of FIG. 3.

The method 1300 proceeds to optional step 1320 which involves driving one or more of a plurality of actuators at a constant resonant frequency. As would be understood by one of skill in the art, a component may have multiple modes/resonant frequencies. In some embodiments, one or more of a plurality of actuators will be driven at the same frequency corresponding to the same mode/resonance frequency of a component. In some embodiments one or more of a plurality of actuators will be driven at different frequencies wherein each actuation frequency corresponds to a different mode (yet a resonance frequency) of the component. Additionally, one or more of a plurality of actuators may be driven at a resonant frequency wherein the resonant frequency corresponds to a resonant frequency of the component proximate to that respective actuator. Alternatively, in some embodiments of the invention, one or more of a plurality of actuators may be driven at a non-resonant frequency or near a resonant frequency.

In optional step 1330, one or more of a plurality of actuators will be driven while sweeping across a dimension of the surface (e.g., a surface of the component). As discussed above with respect to FIG. 12, a plurality of actuators may be driven at either different or overlapping times in a "sweeping" manner, across one or more surfaces or components.

In optional step 1340, one or more of a plurality of actuators will be driven while sweeping the driving frequencies of at least one actuator. In some embodiments, the actuation frequency of an actuator, or a plurality of actuators, may be required in response to changing resonance conditions of the component. For example, a component, such as an aircraft wing surface, may be subject to changing environmental conditions during flight. As would be appreciated by one of skill in the art, the resonance properties of the component (aircraft wing) may vary due to factors such as temperature, altitude, moisture and the affect of ice accretions etc. In response to changing resonance conditions, in some embodiments it may be advantageous to vary (sweep) the driving frequency of one (or more) actuators to correspond to a new or changing resonance frequency of the component. Additionally, in some embodiments, due to power consumption factors, it may be advantageous to change the driving frequency of one or more actuators to either reduce (or increase) net power consumption.

In optional step 1350, a plurality of actuators are driven on a zone-by-zone basis. As discussed above with respect to FIG. 12, each actuation device may be included into essentially any group of actuation devices (i.e., included in any zone). In some embodiments, due to power consumption (or other concerns), it may be advantageous to activate zones by location rather than activating all actuation devices simultaneously. As would be appreciated by one of skill in the art, zone actuation may occur in essentially any pattern in any timing scheme and with any duration. However, in some embodiments, zone activation will occur so as to achieve balance between efficiently removing and/or inhibiting ice accretions on a component while minimizing power consumption.

In optional step 1360, a determination/sensing of icing conditions is made. In some embodiments, this determination will be made with respect to the icing conditions on an outer facing surface of a component. In some embodiments, this determination may be made using one or more sensors such as the sensors 122 depicted in FIG. 1. Furthermore, icing conditions may be determined using a variety of other sensors; by way of example, this determination may be based on, but is not limited to, information received from one or more temperature, altitude, humidity, wind speed, impedance and/or moisture sensors etc. In some embodiments, the icing conditions of a surface of the component may be based, at least in part, on a measured impedance of a surface of the component. Based on the determined conditions, the driving mode and/or driving frequency of one or more actuators and/or actuation zones may be adjusted. By way of example, driving mode/frequency may be adjusted into any of the modes described in steps 1320, 1330, 1340 or 1350 described above.

In step 308, a determination will be made regarding the removal of icing conditions. This determination may pertain to the removal of prior accreted ice, or may be made with respect to the likelihood of new ice formations, for example based on one or more factors, including but not limited to: temperature, altitude, humidity, wind speed, impedance and/or moisture etc. In some embodiments, once a removal of ice from the component is verified, the method 1300 will proceed to step 310 wherein the driving of the one or more of the plurality of actuators is terminated.

The described features, structures, or characteristics of the invention may be combined in any suitable manner in one or more embodiments. One skilled in the relevant art will recognize that the invention can be practiced without one or more of the specific details, or with other methods, components, materials, and so forth. In other instances, well-known structures, materials, or operations are not shown or described in detail to avoid obscuring aspects of the invention. As such, the following descriptions are not to be taken in a limiting sense, but are made merely for the purpose of describing the general principles and exemplary embodiments of the instant invention. The scope of the invention should be determined with reference to the claims.

What is claimed is:

1. A system for an aircraft comprising:
    a component of the aircraft having a surface, the surface comprising an outer facing portion and an inner facing portion;
    a plurality of actuators each positioned proximate to and coupled to the inner facing portion of the surface, wherein each of the plurality of actuators comprises a macro fiber composite (MFC) solid-state electric actuator; and
    a control unit coupled to the plurality of actuators, the control unit configured to drive one or more of the plurality of actuators at one or more frequencies;
    wherein the plurality of actuators are each configured to introduce a displacement of the surface in three dimensions to perform one or both of inhibiting a formation of ice on at least the portion of the surface and breaking up existing ice formations on at least the portion of the surface;
    wherein the plurality of actuators are flexible and substantially conform to a curvature of the surface.

2. The system of claim 1 wherein the control unit comprises:
    a microcontroller; and
    at least one amplifier coupled to the microcontroller and the plurality of actuators.

3. The system of claim 1 wherein the control unit is configured to have a weight to power output ratio that is less than 0.0125 lbs per watt.

4. The system of claim 1 wherein the component comprises a wing of the aircraft and the surface comprises an edge surface of the wing that first contacts air during flight.

5. The system of claim 1, wherein the control unit is configured to drive the one or more of the plurality of actuators at one or more frequencies between 1Hz and 1kHz.

6. The system of claim 5 wherein the control unit is configured to drive the one or more of the plurality of actuators at one or more frequencies between 55 Hz and 235 Hz.

7. The system of claim 1 wherein the one or more frequencies are one or more predetermined frequencies substantially corresponding to one or more resonant frequencies of the surface, the resonant frequencies at least a function of a geometry of the surface.

8. The system of claim 1 wherein the control unit is configured to provide power and the one or more of the plurality of actuators are configured to use the power at no more than 0.1 watts per square centimeter.

9. The system of claim 1 wherein the plurality of actuators are embedded within a composite leading edge of the component with respect to a direction of movement of the component.

10. The system of claim 1 wherein the plurality of actuators are each positioned proximate to the portion of the surface in an evenly spaced manner.

11. The system of claim 1 wherein the component comprises at least a portion of at least one of the following: an aircraft wing, an aircraft tail, an air foil, an aircraft rudder, an aircraft control surface such as a flap or an elevator, a wind turbine blade, an engine intake surface, a helicopter rotor blade, and a refrigeration coil cooling fin.

12. The system of claim 1 wherein the surface of the component comprises at least one of: an alloy, a composite material, graphite, a polymer, a thermoplastic or fiberglass.

13. The system of claim 1 wherein the control unit is configured to selectively drive two or more of the plurality of actuators in time in a sequence relative to each other, the two or more of the plurality of actuators arranged in a pattern extending across at least a portion of the surface.

14. The system of claim 1 wherein the control unit is configured to selectively drive two or more of the plurality of actuators in time in a sequence relative to each other, the two or more of the plurality of actuators arranged in a pattern extending from one portion of the surface in a linear sweep to another portion of the surface.

15. The system of claim 1 wherein the plurality of actuators are arranged in a plurality of zones each zone corresponding to a respective region of the surface, wherein the control unit is configured to selectively drive the plurality of actuators of each of the plurality of zones in time relative to others of the plurality of zones.

16. The system of claim 15 wherein the control unit is configured to drive the plurality of actuators of at least two zones at different frequencies.

17. The system of claim 1 wherein the control unit is configured to drive the one or more of the plurality of actuators at the one or more constant frequencies.

18. The system of claim 1 wherein the control unit is configured to selectively drive the one or more of the plurality of actuators at a plurality of predetermined frequencies within a predetermined time period.

19. The system of claim 18 further comprising at least one sensor coupled to the one or more of the plurality of actuators, the at least one sensor configured to sense an impedance of the one or more of the plurality of actuators when being driven by the control unit.

20. The system of claim 19 wherein the control unit is coupled to the at least one sensor and is configured to switch a driving frequency of the one or more of the plurality of actuators based on signaling received from the at least one sensor.

21. The system of claim 1 wherein the plurality of actuators are each configured to introduce the displacement of the surface in the three dimensions including transverse and longitudinal directions.

22. The system of claim 1 wherein the control unit is configured to automatically drive the one or more of the plurality of actuators.

23. The system of claim 1, wherein each solid-state electric actuator comprises a piezo-kinetic actuator.

24. The system of claim 1, wherein each solid-state electric actuator comprises a piezoelectric material.

25. The system of claim 1, wherein the plurality of actuators each comprising a flexible sheet substantially conforming to the curvature of the surface.

26. The system of claim 1, wherein the plurality of actuators substantially conform to and attach to the curvature of the surface.

27. The system of claim 1, wherein the plurality of actuators each comprise a plurality of ceramic rods between layers of adhesive, electrodes and film.

28. The system of claim 1, wherein the plurality of actuators are each configured to introduce the displacement of the surface in three dimensions to contact a solid layer interface of the existing ice formations contacting the portion of the surface.

29. The system of claim 1, wherein the plurality of actuators are each configured to introduce the displacement of the surface in three dimensions to perform one or both of inhibiting the formation of ice on the at least the portion of the surface and breaking up the existing ice formations on the at least the portion of the surface without active heating of the portion of the surface.

30. The system of claim 1, wherein at least one of the plurality of actuators is configured to introduce the displacement of the surface and is coupled to a sensor that monitors an impedance of the actuator.

31. The system of claim 1, further comprising a sensor coupled to one of the plurality of actuators, the sensor configured to sense an impedance of the one of the plurality of actuators when being driven by the control unit in order to detect icing conditions.

32. The system of claim 1 wherein the control unit is configured to drive the one or more of the plurality of actuators at one or more frequencies including one or more frequencies at or near one or more resonant frequencies of the portion of the surface.

33. The system of claim 1, wherein the control unit is configured to drive one or more of the plurality of actuators at the one or more frequencies and including one of a resonant frequency of the portion of the surface in which ice has not formed thereon and a resonant frequency of the portion of the surface having ice formed thereon.

34. A method for use with an aircraft comprising:
driving a plurality of actuators each positioned proximate to and coupled to an inner facing portion of a surface of a component of the aircraft, the surface further comprising an outer facing portion, wherein each of the plurality of actuators comprises a macro fiber composite (MFC) solid-state electric actuator; and
driving one or more of the plurality of actuators at one or more frequencies such that each of the plurality of actuators introduce a displacement of the surface in three dimensions to perform one or both of inhibiting a formation of ice on at least the portion of the surface and breaking up existing formations of the ice on at least the portion of the surface;

wherein the plurality of actuators are flexible and substantially conform to a curvature of the surface.

35. The method of claim 34, wherein the plurality of actuators each comprise a plurality of ceramic rods between layers of adhesive, electrodes and film.

\* \* \* \* \*